March 31, 1936. M. P. BROWNE 2,035,944
BRACE OR STAY FOR HINGED COVERS AND THE LIKE
Filed March 11, 1935 2 Sheets-Sheet 1
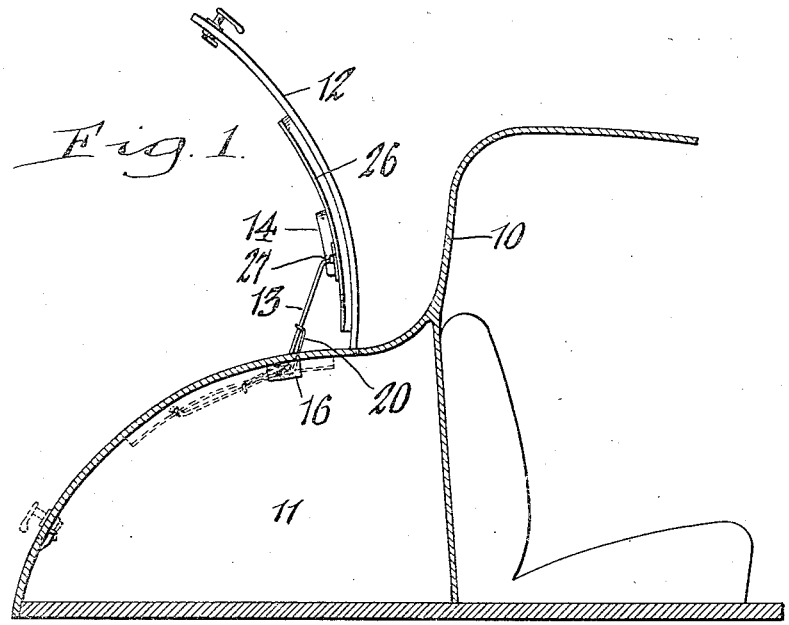
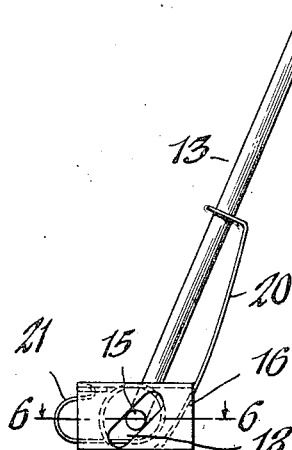
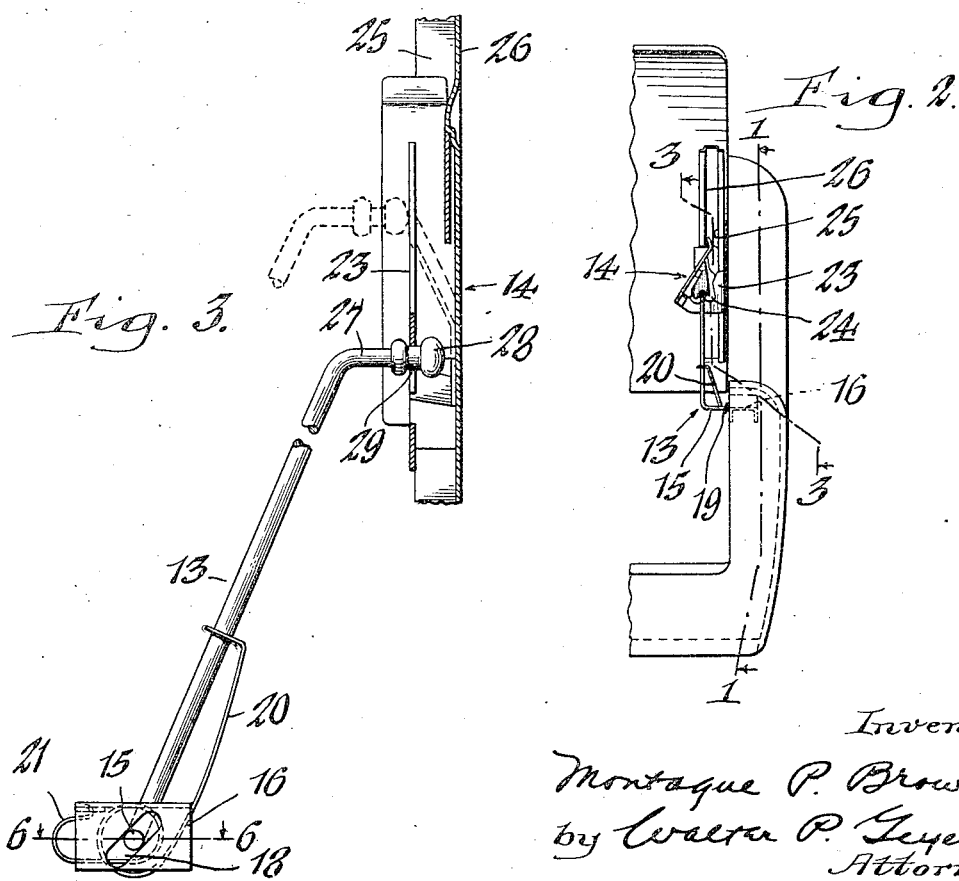
Inventor,
Montague P. Browne,
by Walter P. Geyer
Attorney.

March 31, 1936.  M. P. BROWNE  2,035,944
BRACE OR STAY FOR HINGED COVERS AND THE LIKE
Filed March 11, 1935   2 Sheets-Sheet 2
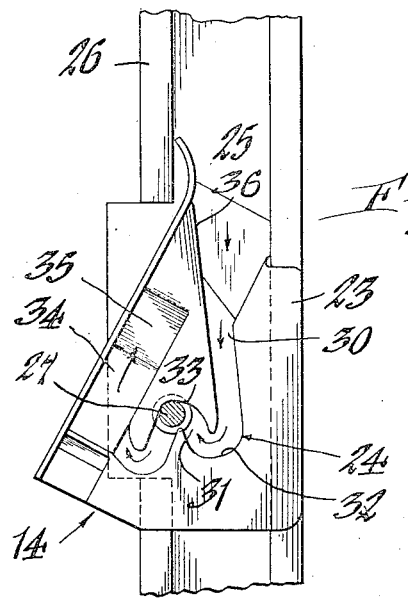
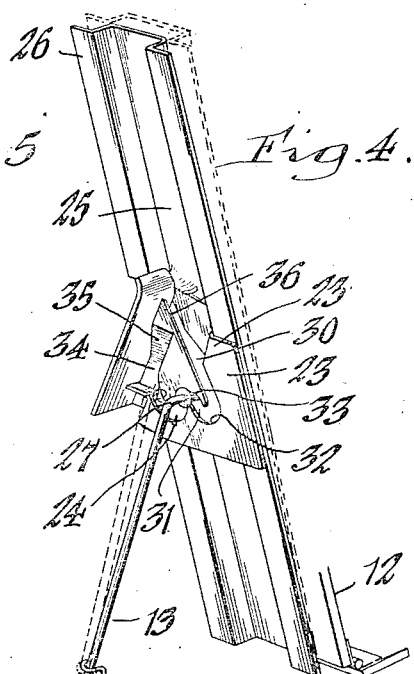
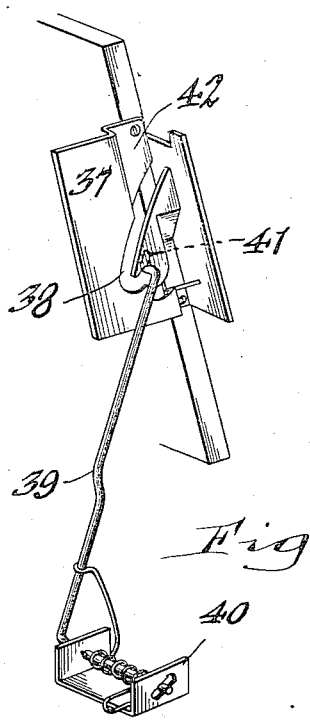
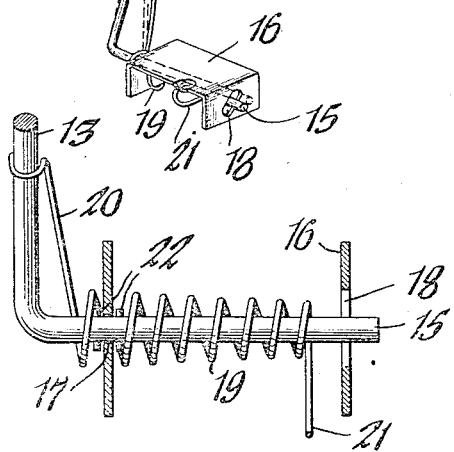
Inventor,
Montague P. Browne,
by Walter P. Guyer
Attorney.

Patented Mar. 31, 1936

2,035,944

UNITED STATES PATENT OFFICE 2,035,944

BRACE OR STAY FOR HINGED COVERS AND THE LIKE

Montague P. Browne, Buffalo, N. Y.

Application March 11, 1935, Serial No. 10,414

10 Claims. (Cl. 217—60)

This invention relates generally to improvements in the stays, props or braces used for holding hinged covers in an open position, but more particularly to an automatically operated stay designed especially for use on the compartment covers and hood covers of automobiles.

It has for one of its objects to provide a stay or bracing device of this character which is so designed and constructed as to be automatically shiftable to its latched and unlatched positions during the opening and closing movements of the cover, and whose parts are so organized as to be operative in any related or variated position of the cover and its attached body.

Another object of the invention is the provision of a cover-stay which is simple, compact and inexpensive in construction, which is reliable and positive in operation, and whose parts have a free sliding action relative to each other into and out of their latched position.

Other features of the invention reside in the construction and arrangement of parts hereinafter described and particularly pointed out in the appended claims.

In the accompanying drawings:—

Figure 1 is a fragmentary sectional view of an automobile body, taken in the plane of line 1—1, Figure 2, showing my invention applied thereto, the compartment-cover being open. Figure 2 is a fragmentary end view of the vehicle body with the compartment-cover open and showing the stay in its latched position. Figure 3 is an enlarged, fragmentary longitudinal section taken substantially in the plane of line 3—3, Figure 2. Figure 4 is a perspective view of the stay-parts showing them in their latched or cover-opened position. Figure 5 is a fragmentary face view of the slotted stay-engaging plate. Figure 6 is an enlarged cross section taken substantially in the plane of line 6—6, Figure 3. Figure 7 is a perspective view of a modified form of the invention.

Similar characters of reference indicate corresponding parts throughout the several views.

Referring now to Figures 1–6, inclusive, of the drawings, wherein my invention is shown as applied to an automobile, 10 indicates the body of the vehicle having a compartment 11 at its rear end for storage or other purposes, and which compartment is normally closed by a vertically-swinging, pivoted cover or lid 12.

My improved stay or bracing device is designed for operative connection to the cover 12 to retain it in the open position shown by full lines in Figures 1 and 2, and comprises relatively movable stay and latching members, indicated generally by the numerals 13 and 14, respectively, one of the members being applied to the vehicle-body and the other to the swinging cover. The stay member 13 is in the form of a pivoted prop or brace bar which is provided at its lower end with a laterally-bent, substantially horizontal pivot arm 15 which is journaled in a substantially channel-shaped bracket 16 secured to the vehicle body and preferably within and adjacent one side of the compartment 11, as shown in Figures 1 and 2. This stay is so mounted in its bracket so as to not only permit of a vertically-swinging movement thereof during the opening and closing of the cover 12, but also so mounted as to have a limited lateral movement crosswise of the cover for a purpose which will hereinafter appear. For accomplishing this combined vertical and lateral movement the stay is universally mounted, one end of the pivot-arm 15 of the stay engaging a circular opening 17 in one of the flanges of the bracket 16, while the other end of such arm engages an elongated opening or slot 18 in the companion flange of the bracket, whereby the stay can rock laterally about the bracket-opening 17 as a fulcrum, as depicted by dotted lines in Figure 4. A coil spring 19 is applied to the pivot-arm 15 of the stay 13 and has one end 20 thereof engaging the stay to constantly urge it to swing in a direction toward the cover 12, while the other end 21 of this spring abuts against the bracket 16 and acts constantly to tilt the stay laterally in one direction, and specifically in a direction from the full line position to the dotted line position of the stay shown in Figure 4. Axial displacement of the pivot-arm 15 of the stay is prevented by pins 22 applied to the inner end thereof and disposed at opposite sides of the adjoining flange of the bracket 16, as seen in Figure 6.

The latching member with which the free or cooperating end of the stay cooperates to hold the cover in its open or elevated position is applied to the underside of the cover and consists of a plate 23 having a substantially heart-shaped slot or guide channel 24 therein which automatically directs the free end of the stay 13 into and out of its latched position during the opening and closing movement of the cover, respectively. Communicating with this heart-shaped slot is a longitudinal groove 25 into which the free end of the stay is adapted to extend in the closed position of the cover, as shown by dotted lines in Figure 1. In the drawings, this groove is formed in a channel-rail 26 constituting an extension of the latch plate and secured to the underside of the cover 12 and to which the plate 23 is connected, although, if desired, the groove 25 may be formed integrally with the cover 12. The slotted portion of the plate 23 spans the groove 25 and is in a plane spaced from the bottom of such groove, as seen in Figures 3 and 4, and the free end of the stay 13 terminates in a forwardly-bent arm 27, which, in the open position of the cover, assumes a position at substantially right angles to the latch-plate 23, and which is provided with a coupling head 28 having a reduced neck or groove 29 which engages the edges of the heart-shaped slot 24 in the manner depicted in Figures 3, 4 and 5, whereby during the registration of the headed end of the stay with the latch-plate-slot, the latter guides or directs such headed end into and out of its latched position, and displacement or withdrawal of the stay from the latch-plate is positively prevented.

The ingress or inlet side 30 of the heart-shaped slot 24 opens into communicating relation with the longitudinal groove 25, so that as the cover is raised the headed end 28 of the stay 13 enters this inlet side of the slot with its ball-end abutting the bottom of the groove and follows the direction of the arrows indicated in Figure 5, ultimately entering the intermediate, reversely-curved or indented latching portion 31 of the slot. The raising of the cover is arrested when the coupling head 28 of the stay encounters the rounded slot-edge 32 leading to the indented portion 31, and thereafter the slight lowering of the cover by hand or by gravity causes the headed end of the stay to travel inwardly of the indented slot portion until such end encounters and interlocks with the seat or notch 33 disposed substantially centrally of such indented portion. At this time, the stay 13 is inclined rearwardly, as seen in Figures 1 and 4, and the weight of the cover retains the stay in its latched position shown in Figures 4 and 5. During the travel of the stay-head 28 in the heart-shaped slot 24, the spring 19 functions to urge the pivoted stay rearwardly toward the latch-plate 23 and laterally to the left, viewing Figures 4 and 5, so that in the latched position of the stay its head is beyond the inlet side of the indented portion 31 and substantially opposite the trailing or outlet side thereof.

This egress or trailing side of the indented portion 31 of the heart-shaped guide channel communicates with an escapement or discharge groove 34 formed in the latch-plate 23 and disposed opposite the inlet side 30 of the channel. Adjacent its outlet end leading to the longitudinal groove 25, this escapement groove 34 has an outwardly-inclined deflecting wall or cam surface 35 in its bottom side terminating flush with the plane of the plate 23, so that when it is desired to lower the cover 12, the same is lifted slightly to bring the headed end 28 of the stay 13 to the curved bottom edge of the trailing side of the slot-portion 31, after which the cover is lowered with the stay-head traversing outwardly through the escapement groove 34 with its ball end riding the bottom thereof and finally entering the intersecting longitudinal groove 25, the spring 19 acting to constantly hold the headed end of the stay in abutting contact with such parts. In entering the groove 25, the stay drops off the edge 36 of the plate 23 due to the pressure exerted by the spring 19 on the stay, and upon again opening the cover this same edge 36 constitutes a baffle or abutment for directing and guiding the stay-head into the inlet side of the slot or channel 24, whereby the pivoted stay is always compelled to automatically travel in a predetermined course in response to the opening and closing movements of the cover, with the spring 19 assisting in such travel.

In the modified form of the invention shown in Figure 7, the latch-plate 37 has its heart-shaped slot or channel 38 disposed in a plane substantially parallel with that of the plane of movement of the pivoted stay 39 mounted on the bracket 40. In other respects, the construction is the same as previously described. However, instead of providing the latching end of the stay with a grooved head, it may terminate in an offset end 41 which engages and interlocks with the rear side of the latch plate adjoining the slot. In this embodiment of my invention, the longitudinal groove 42 leading to the heart-shaped channel is formed integrally with the latch-plate.

I claim as my invention:—

1. A bracing device for hinged covers and the like, comprising a cover-attached member having a guide channel therein shaped to provide an ingress portion, an escapement portion and an intermediate communicating latching portion, an upstanding pivoted stay having a universal pivot connection to permit its swinging in the plane of movement of the cover and laterally thereof and having a coupling head at its free end engageable with said channel, said head engaging the ingress portion of the channel during the opening of the cover and the latching portion thereof in the open position of the cover, and yieldable means applied to the stay and having portions acting on the stay in directions about and laterally of its pivot for constantly urging said stay to swing in directions toward the cover as well as laterally thereof to automatically guide and direct the stay-head through its channel during the opening and closing movements of the cover.

2. A bracing device for hinged covers and the like, comprising a member having a guide channel therein shaped to provide an ingress portion, an escapement portion and an intermediate communicating latching portion, a universally pivoted stay including a prop and pivot arm mounted for vertical and lateral swinging movement and having a coupling head at its free end engageable with said channel, said head engaging the ingress portion of the channel during the opening of the cover and the latching portion thereof in the open position of the cover, and a spring applied to the pivot arm of said stay and having portions acting on the prop and pivot arm of the stay, respectively, for urging said stay to swing vertically in a direction toward said channel member and in a lateral direction from the ingress to the escapement portion of the channel.

3. A bracing device for hinged covers and the like, comprising a member having a guide channel therein shaped to provide an ingress portion, an escapement portion and an intermediate communicating latching portion, a bracket, a pivoted stay mounted on said bracket to swing vertically and having a connection therewith to permit a lateral swinging thereof, said stay having a coupling head at its free end engageable with the ingress and escapement portions of said channel during the movement of the cover to its open and closed positions, respectively, and engageable with the latching portion of the channel in the open position of the cover, and means applied to the stay for yieldingly urging said stay in a direction toward the face of the channeled member and in a lateral direction in traversing from the ingress to the escapement portion of said channel, said means including a spring coiled about the pivoted end of the stay and having one end thereof engaging said bracket and the other end thereof engaging the stay.

4. A bracing device for hinged covers and the like, comprising a member having a guide channel therein shaped to provide an ingress portion, and escapement portion and an intermediate communicating latching portion, a bracket having spaced flanges, one of said flanges having a pivot-opening therein and the companion flange having an elongated opening therein, a pivoted stay mounted on said bracket to swing vertically and having a pivot-arm at one end engaging said bracket openings whereby said stay is free to rock laterally, said stay having a coupling head at its free end engageable with the ingress and escapement portions of said channel during the movement of the cover to its open and closed positions, respectively, and engageable with the latching portion of the channel in the open position of the cover, and a spring applied to said stay for constantly urging it to swing vertically toward the channeled member and to rock laterally of said member in a direction from the ingress to the escapement portion of said channel.

5. The combination with a pivoted stay for hinged covers, of a latch plate having a substantially heart-shaped stay-engaging channel including an ingress portion, an escapement portion and an intermediate latching portion, said escapement portion terminating in a coextensive, stay-engaging groove having an outwardly-inclined deflecting surface in its bottom terminating substantially flush with the plane of the latch plate.

6. The combination with a pivoted stay for hinged covers, of a latch plate having a substantially heart-shaped stay-engaging channel including an ingress portion, an escapement portion and an intermediate latching portion, said latch plate including an extension having a longitudinal stay-receiving groove therein disposed below the plane of the plate and below the discharge end of the escapement portion of the channel and in registering, communicating relation with the ingress portion of said channel.

7. The combination with a pivoted stay for hinged covers, of a latch plate having a substantially heart-shaped stay-engaging channel including an ingress portion, an escapement portion and an intermediate latching portion, and an attaching member for said plate having a longitudinal groove therein disposed below the plane of the plate, said groove extending outwardly from and communicating with the ingress portion of said channel to receive the stay in the closed position of the cover, the escapement portion of the stay-engaging channel having a bottom provided with an outwardly-inclined deflecting surface terminating substantially flush with the plane of the latch plate and intersecting the longitudinal groove of said attaching member at a point above the plane of its bottom.

8. An automatically operable bracing device for hinged covers and the like, comprising a latch plate applied to the inner face of the cover in a plane parallel therewith and having a guide channel therein shaped to provide an ingress portion, an escapement portion and an intermediate latching portion, a universally pivoted stay having a laterally-bent pivot arm at its lower end and a coupling head at its free end facing said plate and engaging said guide channel, a bracket in which the stay-arm is fulcrumed to permit a vertically-swinging movement of the stay toward and from the cover and a limited lateral movement thereof crosswise of the cover, and a spring applied to the pivoted end of said stay for constantly swinging it in a direction to bring its coupling head toward the face of the latch plate in all positions of the cover and for simultaneously urging the stay in a direction transversely of the latch plate and from the ingress portion to the escapement portion of its guide channel.

9. A bracing device for hinged covers and the like, comprising a latch plate adapted for attachment to a cover and having a latching channel therein, a universally pivoted stay adapted for attachment to the cover-bearing member and movable in the plane of movement of the cover and in a direction at substantially right angles thereto, said stay having a coupling head at its free end engageable with said channel for latching the cover in its open position, and spring means applied to said stay and having portions acting on the stay in directions about and laterally of its pivot for urging it to swing in direction both toward and laterally of the cover to properly guide the coupling head in the latching channel during the opening and closing movements of the cover.

10. A bracing device for hinged covers and the like, comprising a latch plate adapted for attachment to a cover and having a latching channel therein, a universally pivoted stay adapted for attachment to the cover-bearing member and movable in the plane of movement of the cover and in a direction at substantially right angles thereto, said stay having a shouldered coupling head arranged to interconnect with the edges of the latching channel to prevent withdrawal of said head from the channel, and a spring applied to said stay and having portions acting on the stay in directions about and laterally of its pivot for urging it to swing in a direction to properly guide the coupling head in the latching channel during the opening and closing movements of the cover.

MONTAGUE P. BROWNE.